United States Patent [19]

Danielson

[11] Patent Number: 4,693,987

[45] Date of Patent: Sep. 15, 1987

[54] MOLYBDENUM SEALING GLASSES

[75] Inventor: Paul S. Danielson, Corning, N.Y.

[73] Assignee: Corning Glass Works, Corning, N.Y.

[21] Appl. No.: 904,285

[22] Filed: Sep. 8, 1986

[51] Int. Cl.$^4$ ............................................. C03C 3/587
[52] U.S. Cl. ..................................................... 501/70
[58] Field of Search ......................................... 501/70

[56] References Cited

U.S. PATENT DOCUMENTS

| 3,978,362 | 8/1976 | Dumbargh, Jr. | 501/70 |
| 4,060,423 | 11/1977 | Thomas | 501/70 |
| 4,238,705 | 12/1980 | Thomas | 501/70 |
| 4,255,198 | 3/1981 | Danielson et al. | 501/70 |
| 4,607,016 | 8/1986 | Danielson et al. | 501/70 |

Primary Examiner—Mark L. Bell
Attorney, Agent, or Firm—C. S. Janes, Jr.

[57] ABSTRACT

This invention relates to glass compositions especially designed for use as envelopes for tungsten-halogen incandescent lamps wherein molybdenum metal lead wires are utilized. The glasses consist essentially, expressed in terms of weight percent on the oxide basis, of 8.5–14% BaO, 10.5–12.5% CaO, 14–15.5% $Al_2O_3$, and 59.5–63% $SiO_2$.

3 Claims, No Drawings

MOLYBDENUM SEALING GLASSES

BACKGROUND OF THE INVENTION

This invention is related to the preparation of glasses suitable for sealing to molybdenum metal and is particularly directed to the production of glass envelopes for tungsten-halogen lamps wherein the glass is sealed to molybdenum metal electrical lead wires.

As the use of tungsten-halogen incandescent lamps has increased in the automotive industry, the manufacturers of glass tubing for the fabrication of envelopes for such lamps have expended considerable research resources to develop glasses suitable for that application, and which are also readily manufacturable. For example, envelopes for those lamps have been fashioned from fused quartz and 96% silica glasses. Those compositions exhibit strain points and thermal stabilities far in excess of the requirements for lamp envelopes. Unfortunately, however, those glasses are quite difficult to form and lampwork and, because of their very low coefficients of thermal expansion, when compared to molybdenum metal, they demand special techniques to seal the lead wires into the lamps.

Inasmuch as envelopes for tungsten-halogen lamps would be most economically produced from glass tubing, research has been directed to glass compositions demonstrating the thermal stability and viscosity parameters necessary for successful operation of the high speed Vello tube drawing process. Thus, the glasses must exhibit a viscosity at the liquidus of at least 50,000 poises, most preferably in excess of 60,000 poises, and a liquidus temperature below 1200° C., most preferably below 1175° C. The glasses must resist devitrification for relatively long periods of time at temperatures at or somewhat below their liquidus temperatures (thermal stability). Experience in lamp operation has demonstrated the need for the strain point of the glass to be in excess of 700° C. and the linear coefficient of thermal expansion of the glass (0°-300° C.) to range between about 46-50×10$^{-7}$/°C. Photoelastic examination of a cylindrical bead seal of the glass with molybdenum wire should indicate essentially zero tensile axial stress at room temperature, although up to about 150 ppm (parts per million) axial compressive stress can be tolerated. At the operating temperature of the lamp (~500° C.), the cylindrical bead seal should indicate only slight tensile stress (no more than about 200 ppm).

Because alkaline earth aluminosilicate glasses can exhibit the physical properties required for envelopes used in tungsten-halogen lamps, much research has centered upon that composition field to formulate glasses suitable for the mass production of lamp envelopes, while concurrently manifesting the properties necessary for lamp operation. Such research is illustrated below in the Prior Art section of this application.

SUMMARY OF THE INVENTION

The glasses of the present invention exhibit liquidus temperatures below 1200° C., desirably below 1175° C., and most preferably in the vicinity of 1150° C., viscosities at the liquidus of at least 50,000 poises, preferably in excess of 60,000 poises, long term thermal stability, strain points in excess of 700° C., but less than 750° C., preferably about 715°-735° C., linear coefficients of thermal expansion (0°-300° C.) between 46-50.5×10$^{-7}$/°C., and essentially zero axial stress at room temperature when sealed to molybdenum metal. Glasses demonstrating those properties consist essentially, expressed in terms of weight percent on the oxide basis, of: 8.5-14% BaO, 10.5-12.5% CaO, 14-15.5% Al$_2$O$_3$, and 59.5-63% SiO$_2$.

Up to 0.3% As$_2$O$_3$ may advantageously be incorporated into the glasses to insure satisfactory fining of the glass melt with the concomitant reduction in the number of seeds developed in tubing prepared from the inventive glasses. U.S. Pat. No. 4,607,016 discloses the utility of 0.17-0.3% As$_2$O$_3$ for that purpose.

Up to 3.5% total SrO+MgO, consisting of 0-2% SrO and 0-2% MgO, may be included in the composition. Alkali metal oxides and iron, however, will be essentially absent.

PRIOR ART

U.S. Pat. No. 3,496,401 constitutes one of the first disclosures of glasses expressly designed for use as envelopes in tungsten-halogen lamps. The glasses described therein were stated to exhibit coefficients of thermal expansion between 30-50×10$^{-7}$/°C., strain points greater than 500° C., liquidus viscosities of at least 5000 poises, and to consist essentially, in weight percent, of 10-25% alkaline earth metal oxides, 13-24% Al$_2$O$_3$, 0-10% B$_2$O$_3$, and 55-70% SiO$_2$. Alkali metal oxides were desirably absent.

Those broad ranges quite obviously encompass those of the inventive glasses, but there is no instruction or suggestion in that patent leading to the products of the present invention. To illustrate, the patent discloses glasses demonstrating strain points in excess of 500° C., liquidus viscosities of at least 5000 poises, and coefficients of thermal expansion between 30-50×10$^{-7}$/°C. In contrast, the instant inventive glasses manifest strain points greater than 700° C., liquidus viscosities at least an order of magnitude greater, and coefficients of thermal expansion between 46-50.5-10$^{-7}$/°C. Accordingly, the glasses of the present invention comprise a significant improvement upon those of the patent. None of the working examples of the patent has a composition coming within the narrow confines of the inventive glasses, so could not exhibit the properties thereof.

U.S. Pat. No. 3,798,491 is drawn to the fabrication of tungsten-halogen lamp glass envelopes having compositions consisting essentially, in weight percent, of 59-70% SiO$_2$, 10-20% Al$_2$O$_3$, and 7.4-28% BaO; those glasses having coefficients of thermal expansion between 36-40×10$^{-7}$/°C. CaO is nowhere referred to in the patent and the coefficients of thermal expansion are lower than required in the instant inventive glasses.

U.S. Pat. No. 3,978,362 is concerned with glasses designed for tungsten-halogen lamp envelopes displaying strain points greater than 700° C., liquidus viscosities of at least 100,000 poises, and coefficients of thermal expansion between 48-55×10$^{-7}$/°C., consisting essentially, in weight percent, of 14-21% CaO, 0-5% MgO, 0-7% BaO, 13-16% Al$_2$O$_3$, and 58-63% SiO$_2$. It is immediately evident that the concentration of CaO is greater than can be tolerated in the present inventive glasses and the level of BaO, even at the upper extreme of its optional presence, is less than the minimum demanded in the instant inventive glasses.

U.S. Pat. No. 4,060,423 is directed to glasses for use as envelopes in tungsten-halogen lamps manifesting liquidi no higher than 1250° C., strain points of at least 725° C., and coefficients of thermal expansion between 42-48×10$^{-7}$/°C., consisting essentially, in weight percent, of 6–13% CaO, 6–16% BaO, 15–18% Al$_2$O$_3$, and 55–68% SiO$_2$. Whereas those broad ranges overlap those of the instant inventive compositions, none of the working examples comes within the narrowly circumscribed limits so as to display the critical advantageous matrix of properties exhibited by the present inventive glasses. For example, the liquidus temperatures are generally higher and the coefficients of thermal expansion generally lower than those required in the instant inventive compositions.

U.S. Pat. No. 4,238,705 describes glasses for use in tungsten-halogen lamps exhibiting a coefficient of thermal expansion between 37–50×10$^{-7}$/°C., and having compositions suitable for sealing to Kovar-type alloys and other iron alloys less expensive than molybdenum. The glasses consist essentially, in weight percent, of 4–8% CaO, 10–23% BaO, 12–18% Al$_2$O$_3$, and 54–71% SiO$_2$. Up to 3% of alkali metal oxides may optionally be present. The levels of CaO are below the minimum required in the present inventive compositions and there is no caveat against the inclusion of alkali metal oxides.

U.S. Pat. No. 4,255,198 relates to glasses developed for use as envelopes for tungsten-halogen lamps demonstrating strain points higher than 730° C., liquidus temperatures below 1200° C., liquidus viscosities of at least 40,000 poises, and coefficients of thermal expansion between 43–48×10$^{-7}$/°C., consisting essentially, in weight percent, of 8–15% CaO, 6–9% SrO, 0–5% MgO and/or BaO, 14–17% Al$_2$O$_3$, and 61–65% SiO$_2$. It is immediately evident that the SrO and BaO contents are outside the limits of the present inventive glasses.

U.S. Pat. No. 4,302,250 reports glasses for use as envelopes for tungsten-halogen lamps displaying strain points higher than 750° C., coefficients of thermal expansion between 42–44×10$^{-7}$/°C., liquidus viscosities of at least 40,000 poises, and liquidus temperatures below 1300° C., consisting essentially, in weight percent, of 11–14% CaO, 2–6.5% SrO+BaO, consisting of 0–4% SrO and 0–5% BaO, 16.5–18.5% Al$_2$O$_3$, and 64–68% SiO$_2$. The coefficients of thermal expansion are lower than those demanded in the present inventive glasses and the Al$_2$O$_3$ and SiO$_2$ levels are higher than the maxima permitted in the instant compositions.

U.S. Pat. No. 4,394,453 records glasses for tungsten-halogen lamp envelopes exhibiting strain points of at least 670° C., coefficients of thermal expansion between 42–45×10$^{-7}$/°C., liquidus temperatures below 1150° C., and liquidus viscosities greater than 20,000 poises, consisting essentially, in weight percent, of 10.6–12.2% CaO, 6.7–8.3% MgO, 4.2–5.8% B$_2$O$_3$, 16–18% Al$_2$O$_3$ and 58.5–61.5% SiO$_2$. BaO comprises no part of the compositions, B$_2$O$_3$ constitutes a substantial proportion of the compositions, and both the MgO and Al$_2$O$_3$ contents are outside the limits of the present inventive compositions.

U.S. Pat. No. 4,409,337 is directed to glasses especially suitable for tungsten-halogen lamp envelopes; the glasses demonstrating strain points higher than 665° C., liquidus temperatures no higher than 1125° C., liquidus viscosities of at least 50,000 poises, and coefficients of thermal expansion between 42–46×10$^{-7}$/°C., and consisting essentially, in weight percent, of 5–9% BaO, 7.5–9.25% CaO, 5.5–6.25% MgO, 4.5–5.25% B$_2$O$_3$, 16–17% Al$_2$O$_3$, and 56–59% SiO$_2$. B$_2$O$_3$ constitutes a significant component of the compositions and the CaO, MgO, and Al$_2$O$_3$ levels are outside the concentrations required in the instant inventive glasses.

U.S. Pat. No. 4,607,016, supra, discloses glasses for use as envelopes for tungsten-halogen lamps; the glasses exhibiting strain points no higher than 750° C., coefficients of thermal expansion of 42–44×10$^{-7}$/°C., liquidus temperatures below 1300° C., and liquidus viscosities of at least 40,000 poises, and consisting essentially, in weight percent, of 11–14% CaO, 16.5–18.5% Al$_2$O$_3$, 64–68% SiO$_2$, 2–6.5% SrO+BaO, consisting of 0–4% SrO and 0–5% BaO, and 0.17–0.3% As$_2$O$_3$. The BaO, Al$_2$O$_3$, and SiO$_2$ concentrations are outside the limits of the present inventive compositions.

DESCRIPTION OF PREFERRED EMBODIMENTS

The following table records a number of glass compositions, expressed in terms of parts by weight on the oxide basis, illustrating the parameters of the present invention. Inasmuch as the sum of the individual components totals or very closely approximates 100, for all practical purposes the reported values may be deemed to reflect weight percent. The actual batch ingredients may comprise any materials, either oxides or other compounds, which, upon being melted together, will be converted into the desired oxides in the proper proportions. To illustrate, CaCO$_3$ can be utilized as the source of CaO.

The batch materials were compounded, ballmilled together to assist in producing a homogeneous melt, and charged into platinum crucibles. After placing lids thereon, the crucibles were introduced into a furnace operating at about 1600° C. and the batches melted for about 16 hours. Subsequently, the crucibles were removed from the furnace, the melts poured into a steel mold to form glass slabs having dimensions of about 15 cm×15 cm×1 cm and those slabs immediately transferred to an annealer operating at about 800° C., and slowly cooled to room temperature.

It must be appreciated that, whereas the glasses recorded in the table below were melted in laboratory crucibles only, the compositions therefor are operable for melting in large scale commercial units. To insure good fining of the glass in such units, arsenic will customarily be included in the batch in an amount necessary to yield about 0.17–0.3% As$_2$O$_3$ in the glass.

The following table also recites measurements of several physical properties determined on the glasses in accordance with techniques conventional in the glass art. The strain point (St.P.) and internal liquidus (Liq.) are reported in terms of °C., and the linear coefficient of thermal expansion over the range of 0°–300° C. (Exp.) is recorded in terms of ×10$^{-7}$/°C.

TABLE

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| SiO$_2$ | 60.5 | 60.7 | 61.4 | 62.4 | 61.8 | 61.5 | 60.8 | 61.2 | 61.2 | 63.1 | 65.2 | 62.5 | 62.1 | 61.1 |
| Al$_2$O$_3$ | 14.6 | 14.6 | 14.8 | 15.1 | 14.9 | 14.8 | 14.7 | 14.9 | 15.7 | 15.3 | 14.6 | 16.2 | 15.1 | 16.1 |
| MgO | 0.05 | 0.6 | 0.6 | 1.2 | 0.6 | 1.2 | 0.4 | 3.0 | 3.0 | 3.0 | 1.4 | 1.2 | 2.0 | 0.03 |
| CaO | 11.5 | 10.7 | 11.7 | 11.9 | 11.8 | 10.9 | 11.2 | 7.4 | 7.4 | 9.3 | 15.2 | 12.4 | 8.3 | 8.0 |
| SrO | 0.2 | 0.2 | 0.3 | 0.3 | 1.8 | 0.3 | 1.1 | 2.3 | 1.5 | 0.2 | 3.6 | 3.1 | 0.2 | 5.9 |
| BaO | 13.1 | 13.1 | 11.2 | 9.1 | 9.1 | 11.3 | 12.0 | 11.2 | 11.2 | 9.2 | 0.05 | 4.6 | 11.3 | 8.8 |

TABLE-continued

|       | 1    | 2    | 3    | 4    | 5    | 6    | 7    | 8    | 9    | 10   | 11   | 12   | 13   | 14   |
| ----- | ---- | ---- | ---- | ---- | ---- | ---- | ---- | ---- | ---- | ---- | ---- | ---- | ---- | ---- |
| St. P.| 721  | 719  | 719  | 719  | 725  | 720  | 718  | 715  | 723  | 720  | 715  | 724  | 718  | 731  |
| Exp.  | 49.5 | 48.1 | 48.9 | 46.2 | 50.1 | 47.7 | 48.3 | 44.5 | 44.4 | 43.0 | 47.5 | 47.2 | 44.2 | 45.7 |
| Liq.  | 1150 | 1153 | 1145 | 1180 | 1176 | 1157 | 1156 | 1243 | 1240 | 1279 | 1251 | 1225 | 1168 | 1257 |

In examples 1 and 14, the MgO content is merely present as an impurity in the batch materials; it was not purposefully included in the glass composition. Similarly, concentrations of SrO in the range of about 0.2% are impurities which are typically present in BaO-containing batch materials.

Examples 8-14 illustrate the criticality of glass composition. In each, the components are close to, but slightly outside of, the ranges required to obtain glass exhibiting the desired properties. The linear coefficients of thermal expansion and/or the liquidus temperatures are outside the specified intervals therefor.

Example 1 is the most preferred composition.

I claim:

1. A glass exhibiting a strain point between 718°-725° C., a linear coefficient of thermal expansion (0°-300° C.) between $46.2-50.1 \times 10^{-7}/°C.$, a liquidus temperature between 1145°-1180° C., a viscosity at the liquidus temperature of at least 50,000 poises, and essentially zero tensile axial stress at room temperature when sealed to molybdenum metal, said glass consisting essentially, expressed in terms of weight percent on the oxide basis, of 9.1-13.1% BaO, 10.7-11.9% CaO, 14.6-15.1% $Al_2O_3$, and 60.5-62.4% $SiO_2$.

2. A glass according to claim 1 also containing up to 0.3% $As_2O_3$.

3. A glass according to claim 1 also containing up to 3.5% SrO+MgO consisting of 0-2% SrO and 0-2% MgO.

* * * * *